(12) United States Patent
Shiba et al.

(10) Patent No.: US 6,895,297 B2
(45) Date of Patent: May 17, 2005

(54) NUMERICAL CONTROL DEVICE

(75) Inventors: Kazuhiro Shiba, Shizuoka-ken (JP); Minoru Hamamura, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/281,983

(22) Filed: Oct. 29, 2002

(65) Prior Publication Data

US 2003/0083772 A1 May 1, 2003

(30) Foreign Application Priority Data

Oct. 30, 2001 (JP) .................................... P2001-333042

(51) Int. Cl.[7] ............................................. G06F 19/00
(52) U.S. Cl. ..................................................... 700/172
(58) Field of Search .............................. 700/28, 32–34, 700/40, 75–77, 108–110, 172–174

(56) References Cited

U.S. PATENT DOCUMENTS 4,293,913 A * 10/1981 Nishimura et al. ......... 700/185
5,255,201 A * 10/1993 Maeda ........................ 700/193
5,256,951 A * 10/1993 Nashiki et al. .............. 318/575
6,512,961 B1 * 1/2003 Fukaya et al. .............. 700/174
6,671,571 B1 * 12/2003 Matsumiya et al. ........ 700/172

FOREIGN PATENT DOCUMENTS

JP          2002108425 A    *   4/2002
JP          2002172543 A    *   6/2002

* cited by examiner

Primary Examiner—Maria N. Von Buhr
(74) Attorney, Agent, or Firm—Finnegan, Henderson, Farabow, Garrett & Dunner, L.L.P.

(57) ABSTRACT

A numerical control device is disclosed having a parameter memory section 12B that stores discrete optimum parameters for respective operational modes, an operational mode setting switch 20 to allow operational modes to be selectively set through user's operation, and a defect content setting means for registering defect contents of machined results. The optimum parameter, suited for a particular operational mode selected and set with the operational mode setting switch 20, is retrieved for executing setting of the parameter while enabling setting of the parameter based on information obtained with the defect content setting means.

4 Claims, 20 Drawing Sheets

NUMERICAL CONTROL DEVICE

BACKGROUND OF THE INVENTION

1. Field of the Invention

The present invention relates to numerical control devices and, more particularly, to a numerical control device for a machine tool that performs a variety of cutting operations.

2. Description of the Related Art

A servo control system for a feed drive system (control axis) of a numerically controlled machine tool has optimum values for a servo gain, a velocity controlled value and a corrected value (corrected value for backlash) during reversed rotation of the axis, respectively, with parameters of the optimum values having influences a machining accuracy, such as a surface roughness and shape accuracy or the like, and a machining time interval.

In a related art, the servo control system has no function for enabling optimum servo tunings to be executed for respective machining operations, with an inability of executing the optimum servo tunings for the respective machining operations. Thus, for every machining operations, it is a general practice to set a typical parameter by which an affect is offered to some extent. Further, with a special purpose machine tool specifically structured for performing a specific machining operation, it is a usual practice for a specific tuning to be implemented so as to meet such a particular machining operation each time the special purpose machine tool is manufactured and delivered.

SUMMARY OF THE INVENTION

However, the numerical control device is complicated in function in a recently developed machine tool that requires to be operated at a high speed and at a high accuracy, with a resultant difficulty arising for a user to understand which function is utilized to perform a desired machining operation.

In addition, the servo tuning value and the corrected value have optimum values different from one another depending on machining conditions, resulting in an issue in which the parameter tunings, typically conducted up to now, are unable to cover a range under which the machining condition is optimum for entire machining operations.

The present invention has been completed with a view to addressing the issues as set forth above and has an object to provide a numerical control device which enables optimum parameters, such as a servo gain, a velocity limit value and a corrected value for a reversed rotation of an axis, to be easily set in dependence on a variety of machining operations while, at the same time, enabling tuning of the optimum parameters to be easily executed in dependence on the various machining operations on the basis of an evaluation of machined results.

To achieve the above object, according to a first aspect of the present invention, a numerical control device comprises a memory section that stores discrete optimum parameters suitable for operational modes, respectively, an operational mode setting section that allows a particular operational mode to be set through a user's operation, wherein a particular parameter, suited for the particular operational mode selected and set with the operational mode setting section, is retrieved from the memory section to allow setting of the particular parameter to be executed.

With the numerical control device of such a structure, the operational modes are set for various machining operations such as a kind of machining operations, respectively. Selecting the operational modes allows the optimum parameter suited for the selected operational mode to be executed.

According to a second aspect of the present invention, the discrete optimum parameters for the respective operational modes include servo parameters for respective control axes and, in addition, the optimum parameter includes a corrected value for a reversed rotation of an axis, a velocity limit value and an acceleration limit value, etc.

According to a third aspect of the present invention, the numerical control device further comprises a defect content setting unit permitting a defect content of a machined result to be set through the user's operation, wherein a parameter, correlated with occurrence of the defect content that is set with the defect content setting unit, is retrieved from the memory section in accordance with a preset rule to permit the retrieved parameter to be updated.

With the numerical control device according to the third aspect of the present invention, it is possible for the optimum parameter to be set in dependence on the various machining operations on the basis of an evaluation of machined results.

According to a fourth aspect of the present invention, the numerical control device further comprises a machining history memory section that stores a parameter set value appearing when executing a machining program and information related to a machined result for each machining program which is executed.

With the numerical control device according to the fourth aspect mentioned above, referring to information stored in the machining history memory section may also set the optimum parameter.

DESCRIPTION OF PREFERRED EMBODIMENT

An embodiment of the present invention is described below in detail with reference to the accompanying drawings.

Figure 1:
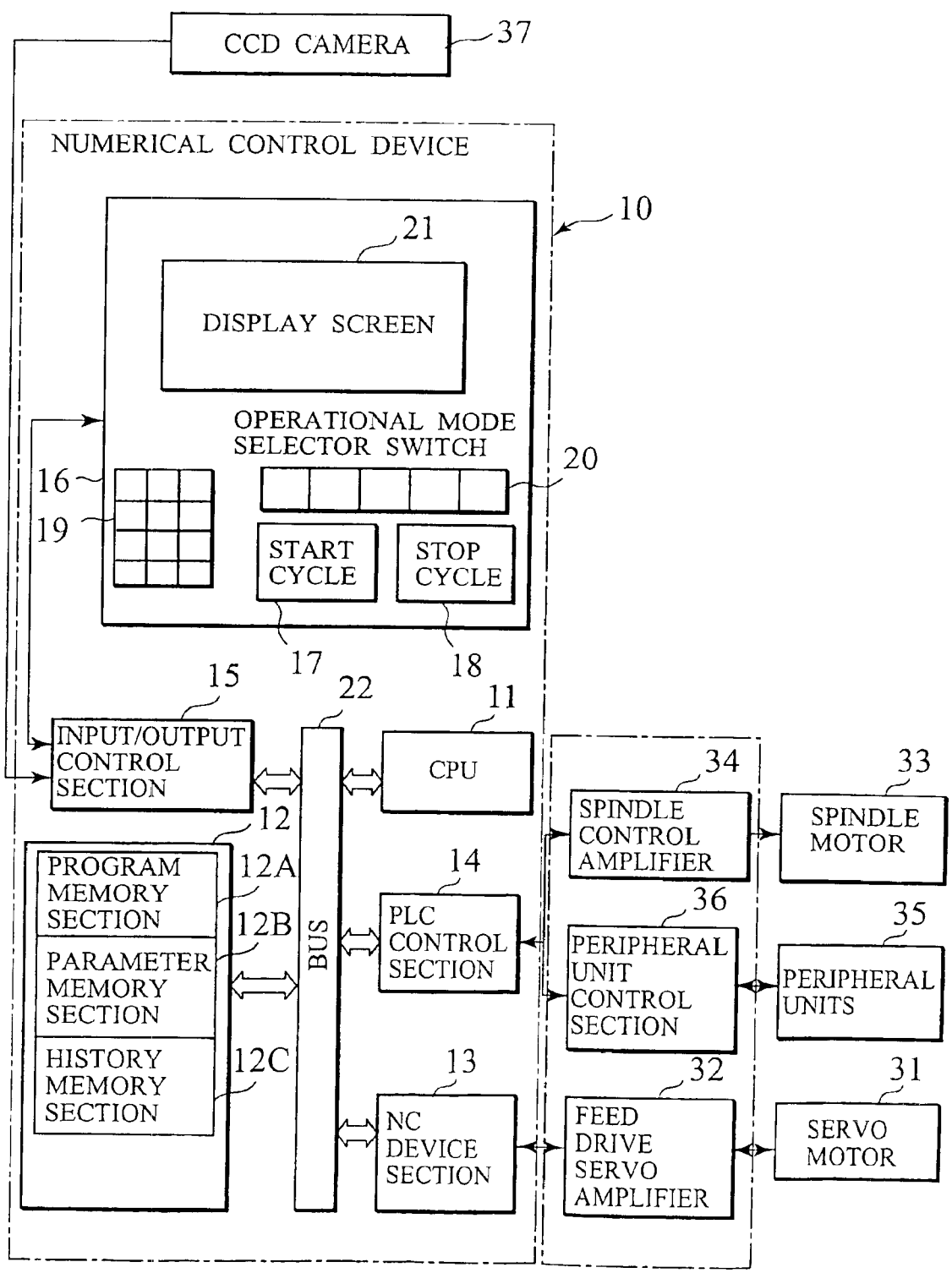
FIG. 1 is a block diagram illustrating a numerical control device of an embodiment according to the present invention.

FIG. 1 shows a numerical control device of an embodiment according to the present invention.

The numerical control device 10 is configured to have a structure in a computer type that includes a CPU 11, a memory unit 12, a NC device section 13, a PLC (programmable logic controller) control section 14, an input/output control section 15, a bus 22 that mutually interconnects these components with respect to one another, and an operation panel 16 that serves as a machine interface section.

The memory unit 12 is comprised of re-writable memories such as RAMs. The memory unit 12 has memory areas allocated with a program memory section 12A that stores machining programs, a parameter memory section 12B that stores an optimum parameter discretely provided for each operational mode, and a machining history memory section 12C, that stores a parameter set value for executing the machine program and information correlated with a machined result for each of the machine programs which are executed.

The operation panel 16 has a cycle start button 17, a cycle stop button 18, a keyboard 19, operational mode selector switches 20, and a display 21, such as a CRT, LCD, etc. A user is able to execute various settings on an inactive basis.

Connected to the NC control section 13 is a feed drive servo motor amplifier 32 that performs control of electric power to be applied to a servo motor 31. The PLC control section 14 is connected to a spindle motor control amplifier 34 that performs control of electric power to be applied to a spindle motor 33, and a peripheral unit control section 36 that controls operations of peripheral units 35, such as a coolant supply unit, etc.

The input/output control section 15 is connected to a CCD camera 37 that pickups an image of a workpiece who's machining is terminated.

The operational mode selector switches 20 of the operation panel 16 serve as operational mode selecting and setting means through which operational modes are selectively set responsive to user's operations. The CPU 11 is operative to read out the optimum parameter, suitable for the operational mode selected with the operational mode selection switches 20, from the parameter memory section 12B to allow the read out optimum parameter to be automatically set for the NC control section 13, the feed drive servo motor amplifier 32 and the spindle motor control amplifier 34.

The operational modes include the following items of which one operational mode is set through the user's operation with the use of the operational mode selection switches 20. For respective operational modes to be set, the optimum machining condition is set for each operational mode.

Drilling, milling

Contouring (rough roughing and finishing)*Parts machining, mold machining

High speed machining, high acceleration machining, low speed machining, low acceleration machining High performance machining, high precision machining, high quality machining Circular interpolation, linear interpolating, minute block, free form Standard machining, specific machining (synchronized tapping, non-rotating machining)

Kinds of workpieces, kinds of tools

Setting Parameter by user (for tolerances, velocity, etc.)

The parameter for each operational mode set forth above which is stored in the parameter memory section 12B includes servo parameters, such as a positional loop gain, a velocity loop gain, a filter value, an inertial force compensated value, an acceleration time and a primary delay time constant, etc. Further stored in the parameter memory section 12B are restrictive function parameters that include a velocity limit value and an acceleration limit value. Other parameters include a backlash compensated value, that forms a compensated value for reversed operation of an axis, and a stick motion compensated value, etc.

The keyboard 19 of the operation panel 16 serves as a defect content setting means for permitting the user operation to set a defect content appearing in the results of machining. The CPU 11 retrieves the parameters related to occurrences of the defect content preset with the keyboard 19 in accordance with a preset rule to cause the relevant parameters to be updated or re-set. This means that rewriting (updating) of an optimum parameter for each operational mode, that is stored in the parameter memory section 12B, is enabled.

Now, the basic sequence of operations of the numerical control device 10 set forth above is described below with reference to FIGS. 2 to 10.

(Overall Operation)

Figure 2:
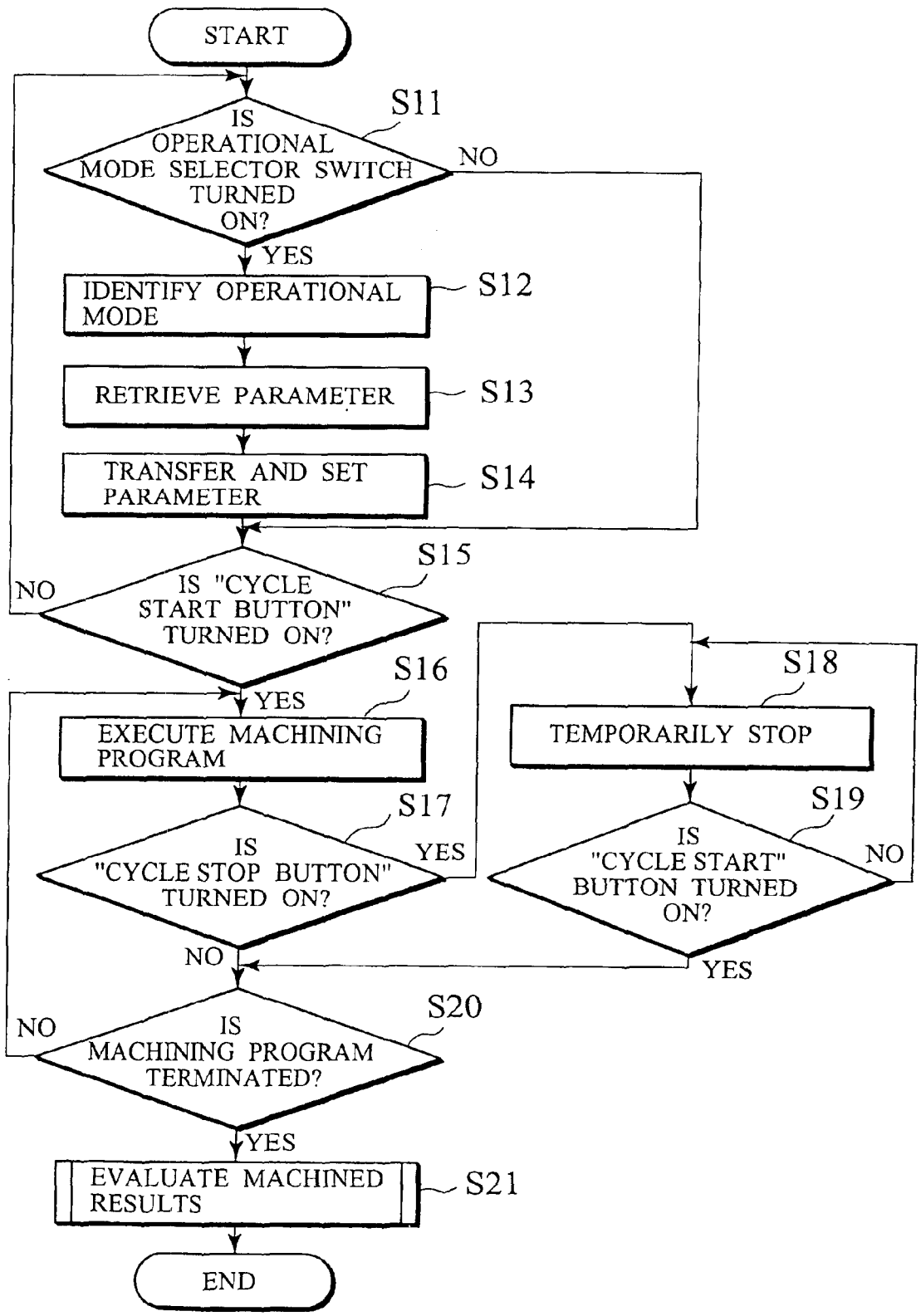
FIG. 2 is a flowchart illustrating a general routine of the numerical control device according to the present invention.

Overall operation (general routine) is described with reference to FIG. 2.

First, input signals indicative of status of the operational mode selector switches 20 are taken in and monitored as to which operational mode selector switch 20 is selected by the user operation (step S11). If either one of the operational mode selector switches 20 is turned on (designated as YES in step S11), the operational mode selected by the input signal is identified (step S12), with the optimum parameter suited for the selected operational mode being retrieved from the parameter memory section 12B (step S13). The retrieved optimum parameter is then transferred to the NC device section 13, the drive axis servo amplifier 32 and the spindle motor control amplifier 34.

Thus, the optimum parameter suited for the operational mode selected by the user is set in the NC control section 13, the drive axis servo amplifier 32 and the spindle motor control amplifier 34 (step S14).

As the cycle start button 17 is turned on (designated as YES in step S15), the machining program is executed (step S16). This allows the machining to be carried out under the numerical control.

During a time interval in which the machining program is executed, the status of the cycle stop button 18 is monitored (step S17) and if the cycle stop button 18 is turned on (designated as YES in step S17), the machining operation is temporarily interrupted (step S18). During a time interval in which the machining operation is temporarily interrupted, the status of the cycle start button 17 is monitored (step S19) and if the cycle start button 17 is turned on (designated as YES in step S19), then the machining is started again at a point where the machining is temporarily interrupted.

As the machining program is terminated (designated as YES in step S20), that is, as the machining is completed, a subroutine is retrieved for evaluating a machined result (step S21).

(Evaluation of Machined Result)

Figure 3:
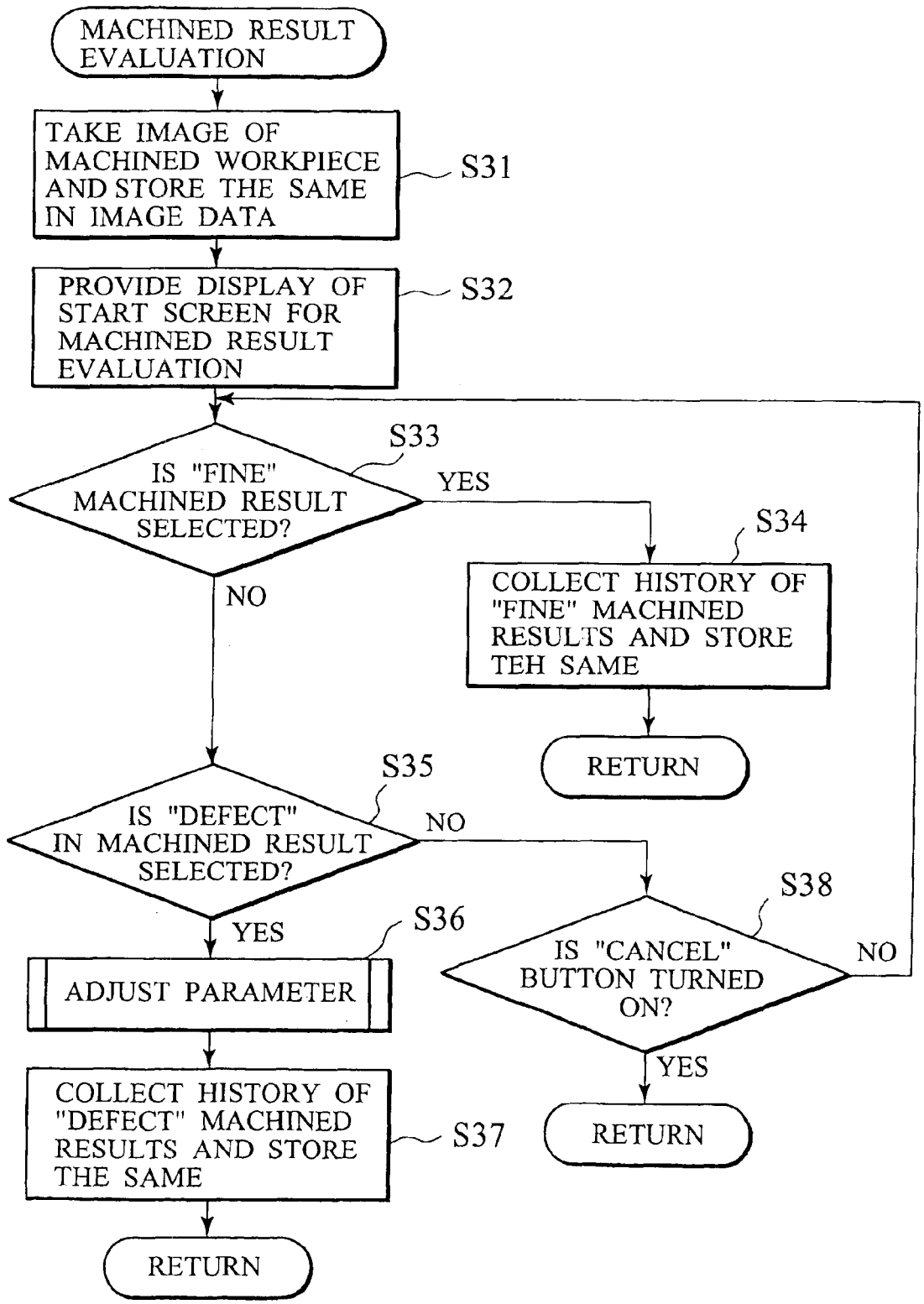
FIG. 3 is a flowchart illustrating a subroutine illustrating an evaluation of a machined result of the numerical control device according to the present invention.

The subroutine for evaluation of the machined result is described with reference to FIG. 3.

First, an image of the workpiece, who's machining is terminated, is picked up with the CCD camera 37 which in turn produces image data, which is stored in the memory unit 12 (step S31).

Figure 11:
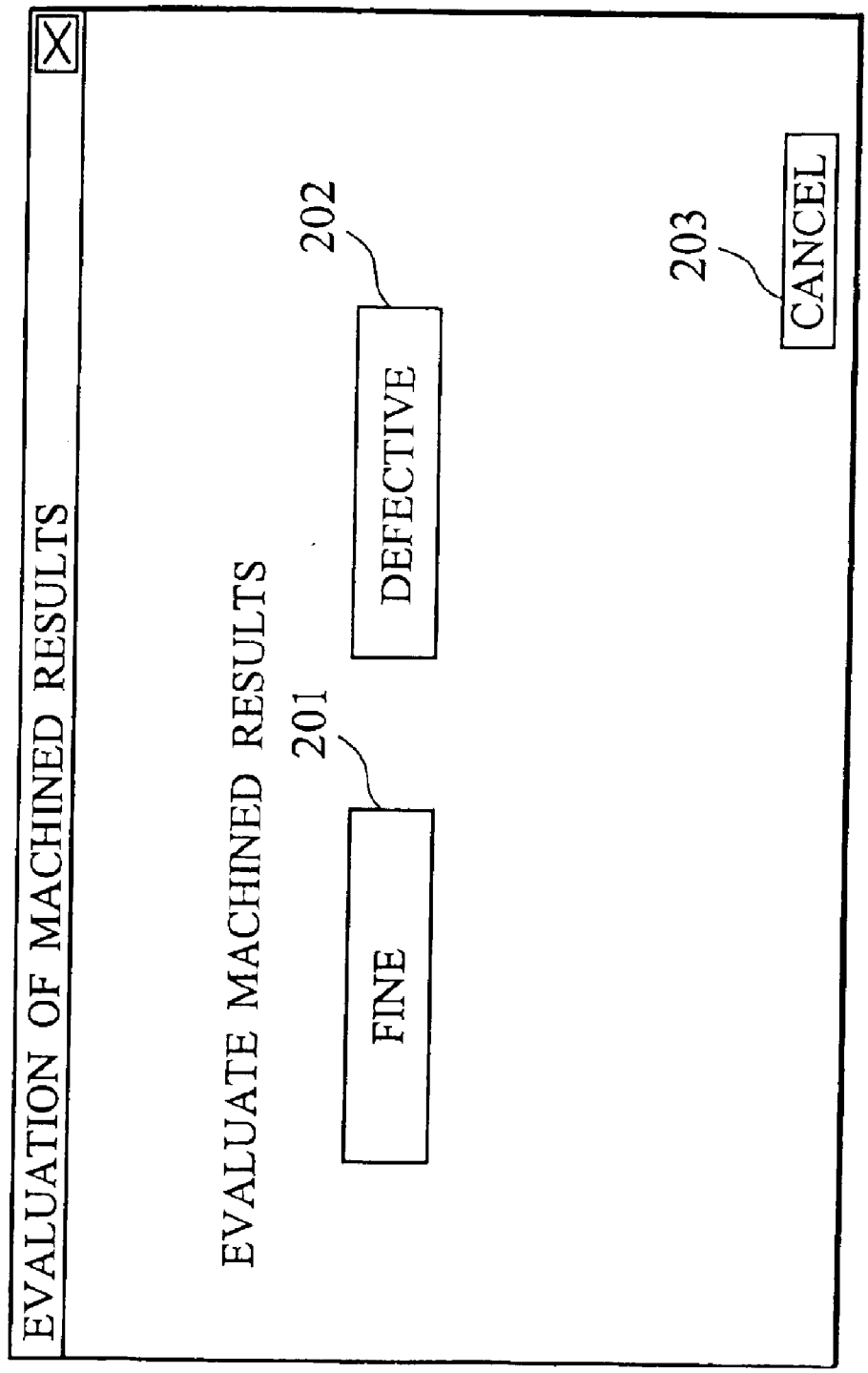
FIG. 11 is an illustrative view showing a start screen display for a machined result evaluation in the numerical control device according to the present invention.

Next, the display 21 of the operation panel 16 is displayed with a starting screen for the machined result evaluation as shown in FIG. 11 (step S32).

With the starting screen for the machined result evaluation, if a "FINE" button 201 is depressed to select a "FINE" result of the machined result (designated as YES in step S33), operation proceeds to collect the name of the currently executed machining program, the parameter set value, the name of the tools used for the machined workpiece and a volume and material thereof, the name of files of CAD*CAM, the name of file of image data of the machined workpiece taken with the CCD camera 37, and date and hour of data, etc. Such collected data are then stored in the history memory section 12C as history data (step S34) and routed back to the original routine.

On the contrary, if a "DEFECTIVE" button 202 is depressed to select a "DEFECTIVE" result of the machined result (designated as YES in step S35), operation proceeds to retrieve a subroutine for parameter adjustment (step S36).

When the routine for the parameter adjustment is terminated, operation proceeds to collect the name of the currently executed machining program, the parameter set value, the name of the tools used for the machined workpiece and a volume and material thereof, the name of files of CAD*CAM, the name of file of image data of the machined workpiece taken with the CCD camera 37, a defective content, and date and hour of data, etc. Such collected data are then stored in the history memory section 12C as history data of a defective machining of the workpiece (step S37) and routed back to the original routine.

On the starting screen for the machined result evaluation, if the cancel button 203 is depressed (designated as YES in step S38), operation promptly returns to the original routine.

(Parameter Adjustment)

Figure 4:
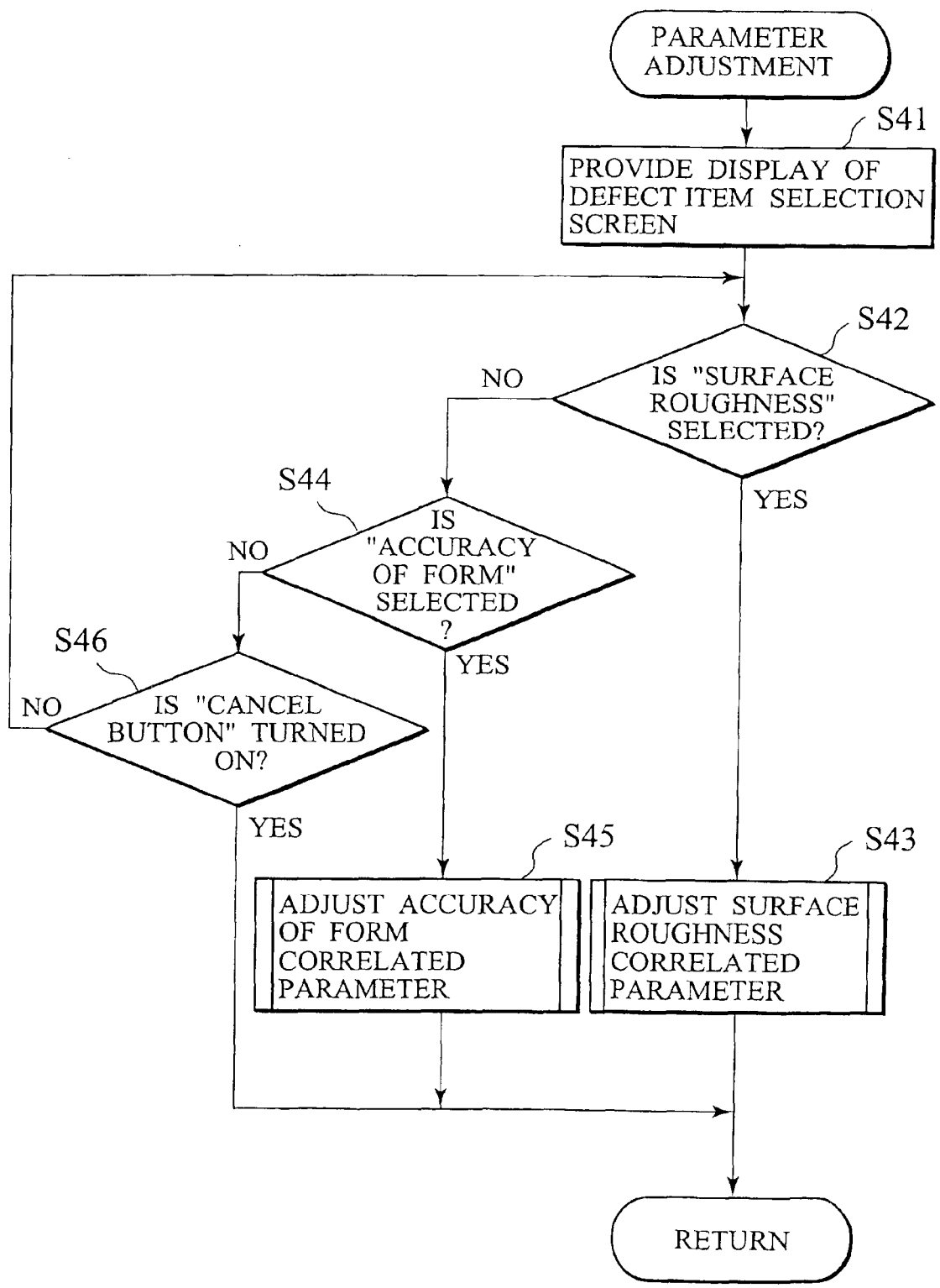
FIG. 4 is a flowchart illustrating one of subroutines for parameter adjustment in the numerical control device according to the present invention.

The subroutine for parameter adjustment is described with reference to FIG. 4.

Figure 12:
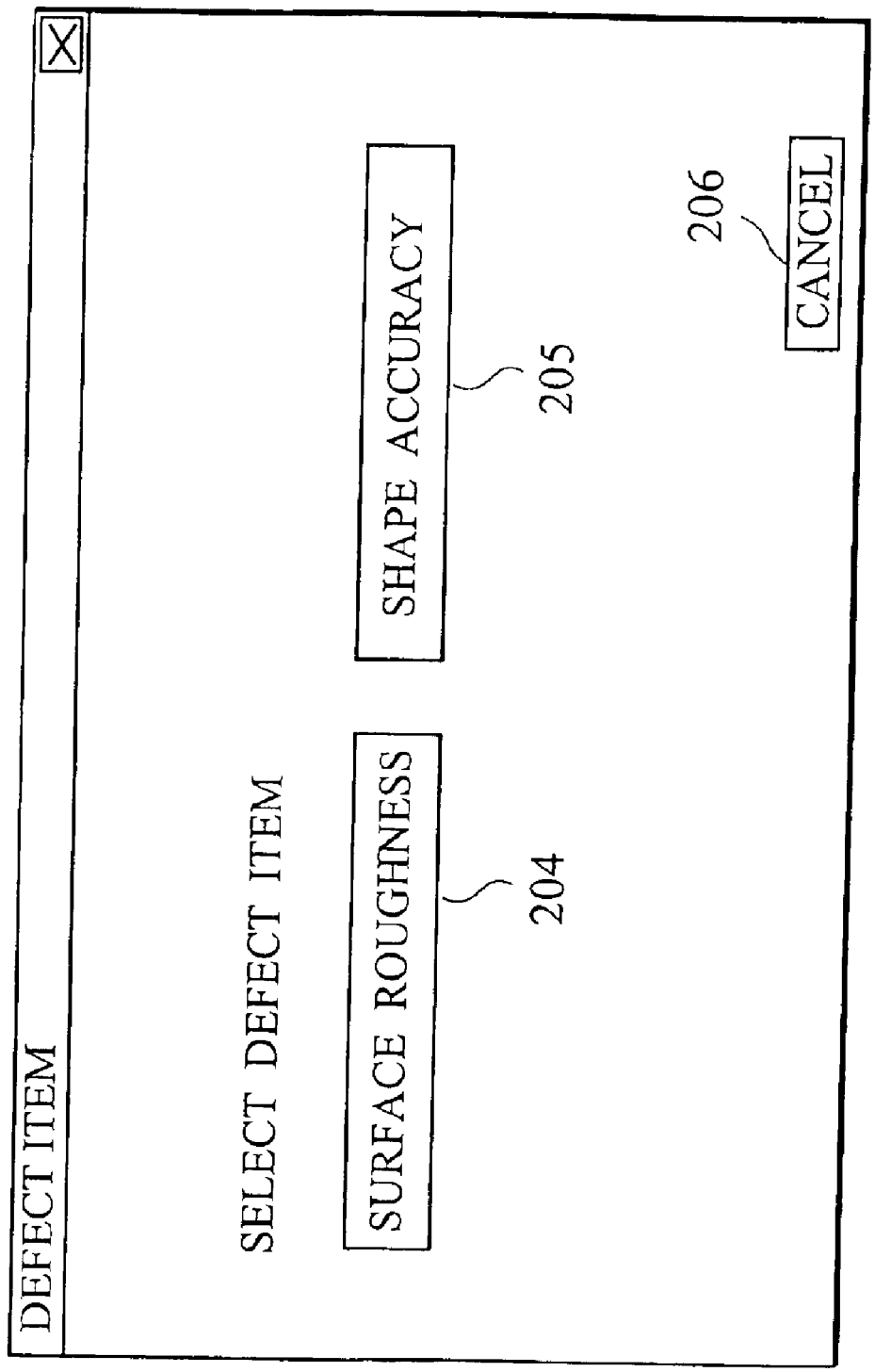
FIG. 12 is an illustrative view showing a screen display for a defect item selection in the numerical control device according to the present invention.

Initially, the display 21 of the operation panel 16 is provided with a screen for a defect item selection shown in FIG. 12 (step S41).

On the screen for the defect item selection, if a "SURFACE ROUGHNESS" button 204 is depressed to select a "DEFECT" result in a surface roughness (designated as YES in step S42), operation proceeds to retrieve a subroutine for parameter adjustment related to the surface roughness, as will be described later (step S43).

On the contrary, if a "ACCURACY OF FORM" button 205 is depressed on the defect item selection screen to select a defect result in an "ACCURACY OF FORM" (designated as YES in step S44), operation proceeds to retrieve a subroutine for parameter adjustment related to the accuracy of form, as will be described later (step S45).

On the defect item selection screen, if the "CANCEL" button 206 is depressed (designated as YES in step S46), operation promptly returns to the original routine.

(Parameter Adjustment for Surface Roughness)

Figure 5:
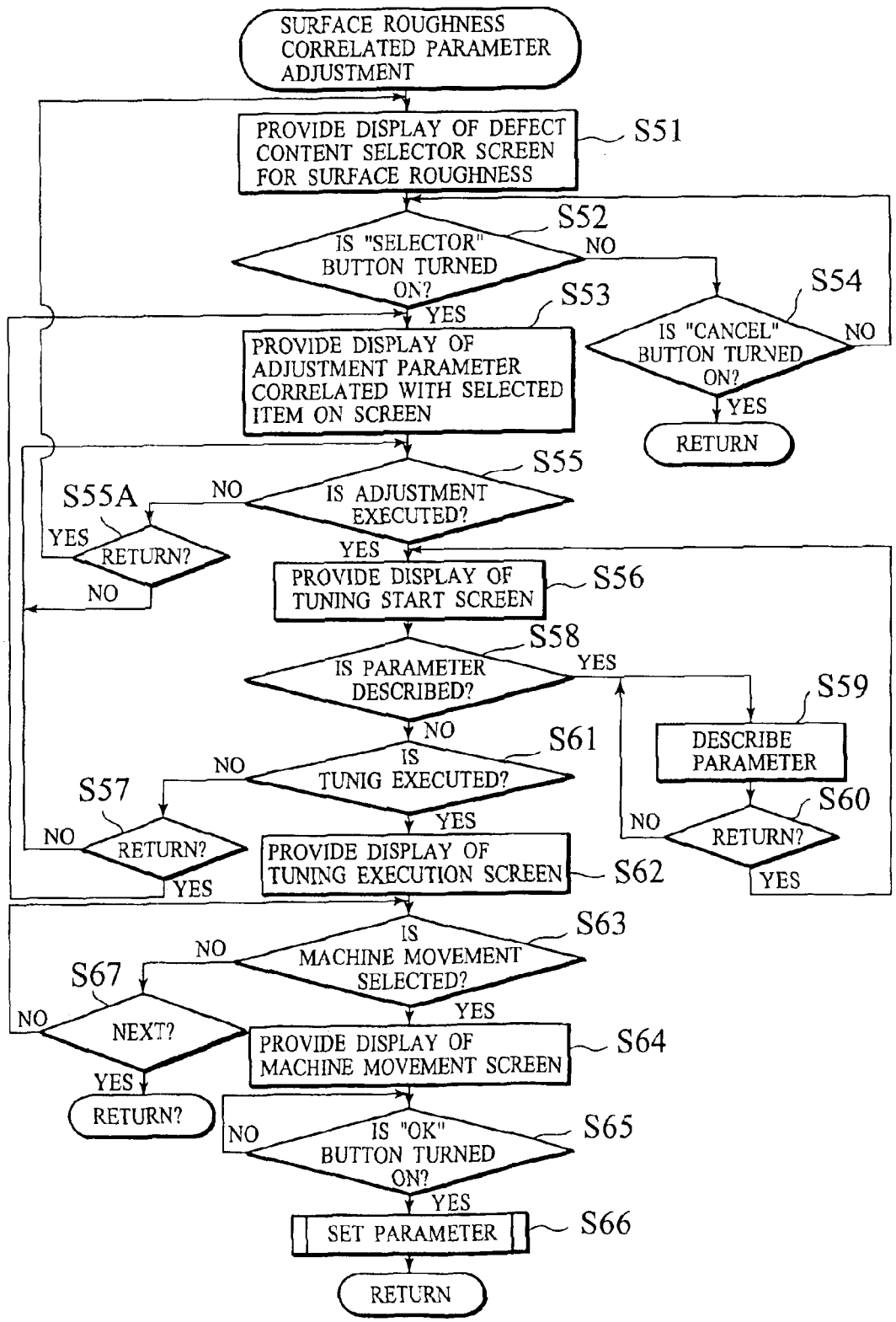
FIG. 5 is a flowchart illustrating a subroutine for surface roughness correlated parameter adjustment in the numerical control device according to the present invention.

The subroutine for enabling execution of the parameter adjustment correlated with the surface roughness is described with reference to FIG. 5.

Figure 13:
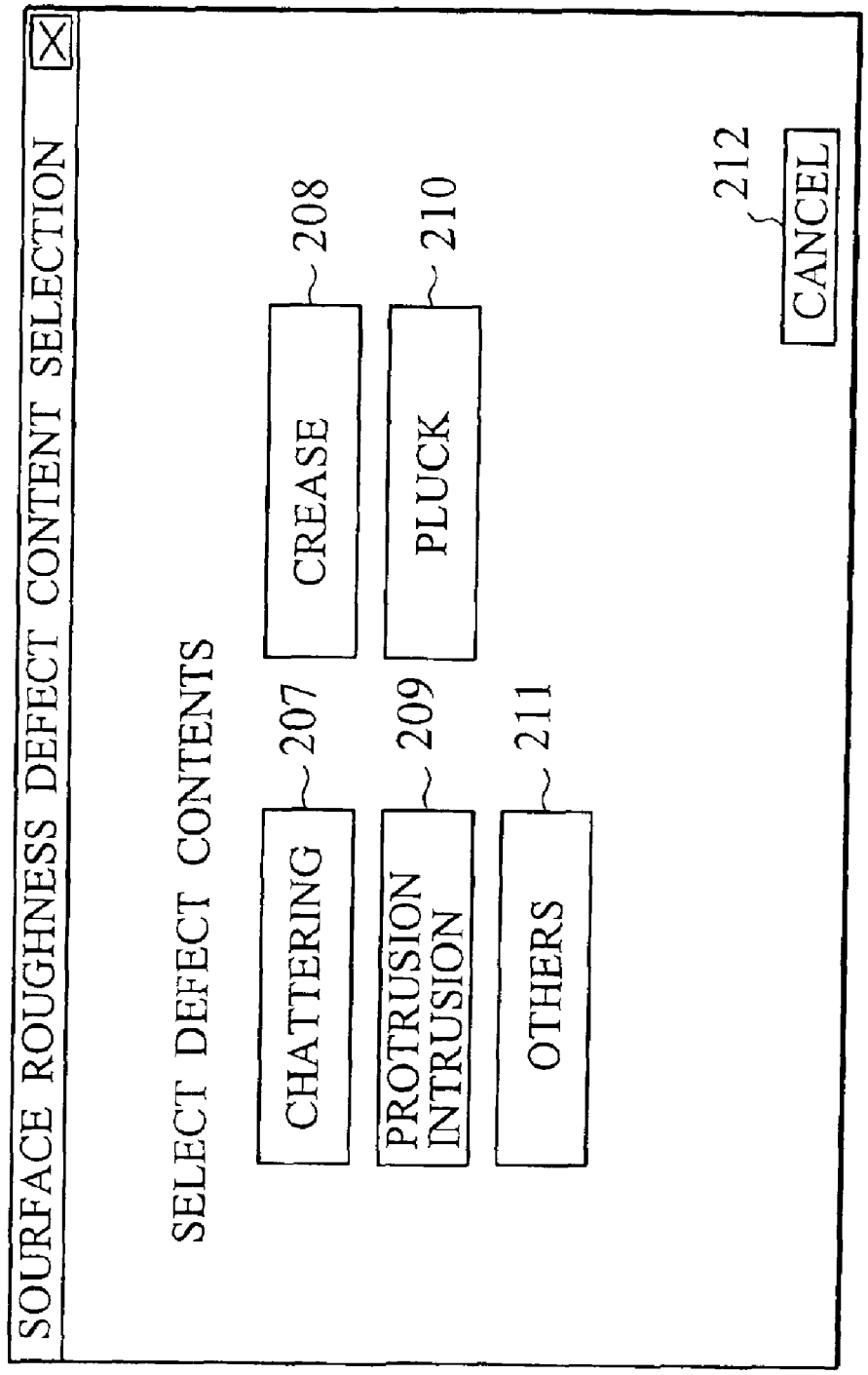
FIG. 13 is an illustrative view showing a screen display for a surface roughness defect item selection in the numerical control device according to the present invention.

Initially, the display 21 of the operation panel 16 is provided with a defect item selection screen for the surface roughness shown in FIG. 13 (step S51).

The surface roughness defect content selection screen is provided with buttons for designating surface roughness defect contents, such as a "CHATTERERING" button 207, a "CREASE" button 208, a "PROTRUSION*INTRUSION" button 209, a "PLUCK" button 210 and an "OTHERS" button 211. The user operates to select one of these defect content selection buttons to allow a particular defect content in the surface roughness to be designated.

Figure 14:
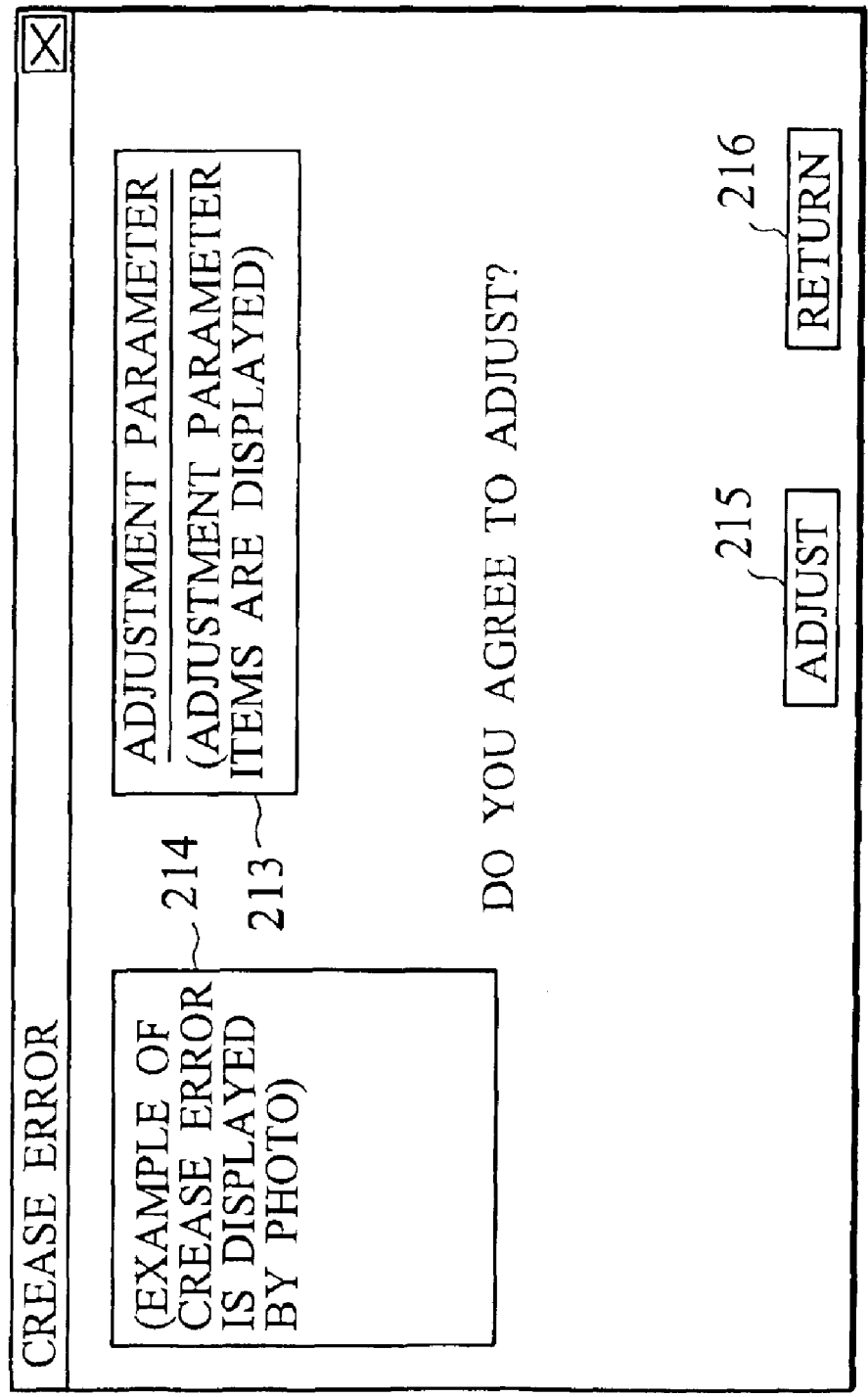
FIG. 14 is an illustrative view showing one of display screens of the adjustment parameter in the numerical control device according to the present invention.

As the selection button is turned on (designated as YES in step S52), the display 21 of the operation panel 16 is provided with the screen for the adjustment parameter correlated with the selected item (indicative of defect content) (step S53). For instance, as the "CREASE" button 208 is selected, the display is provided with a screen for parameter adjustment correlated with a crease error in a manner as shown in FIG. 14.

The adjustment parameter screen (see FIG. 14) is provided with a display of a list of the parameters, correlated with the selected defect content, for an object to be adjusted at an adjustment parameter display column 213 and a display of a photo of an error example (for instance, a crease error) at an image display column 214 in accordance with a rule based on a predetermined defect occurrence correlated parameter.

Also, in a case where the "CANCEL" button 212 is depressed on the surface roughness defect content selection screen (see FIG. 13) (designated as YES in step S54), operation promptly returns to the original routine.

Figure 15:
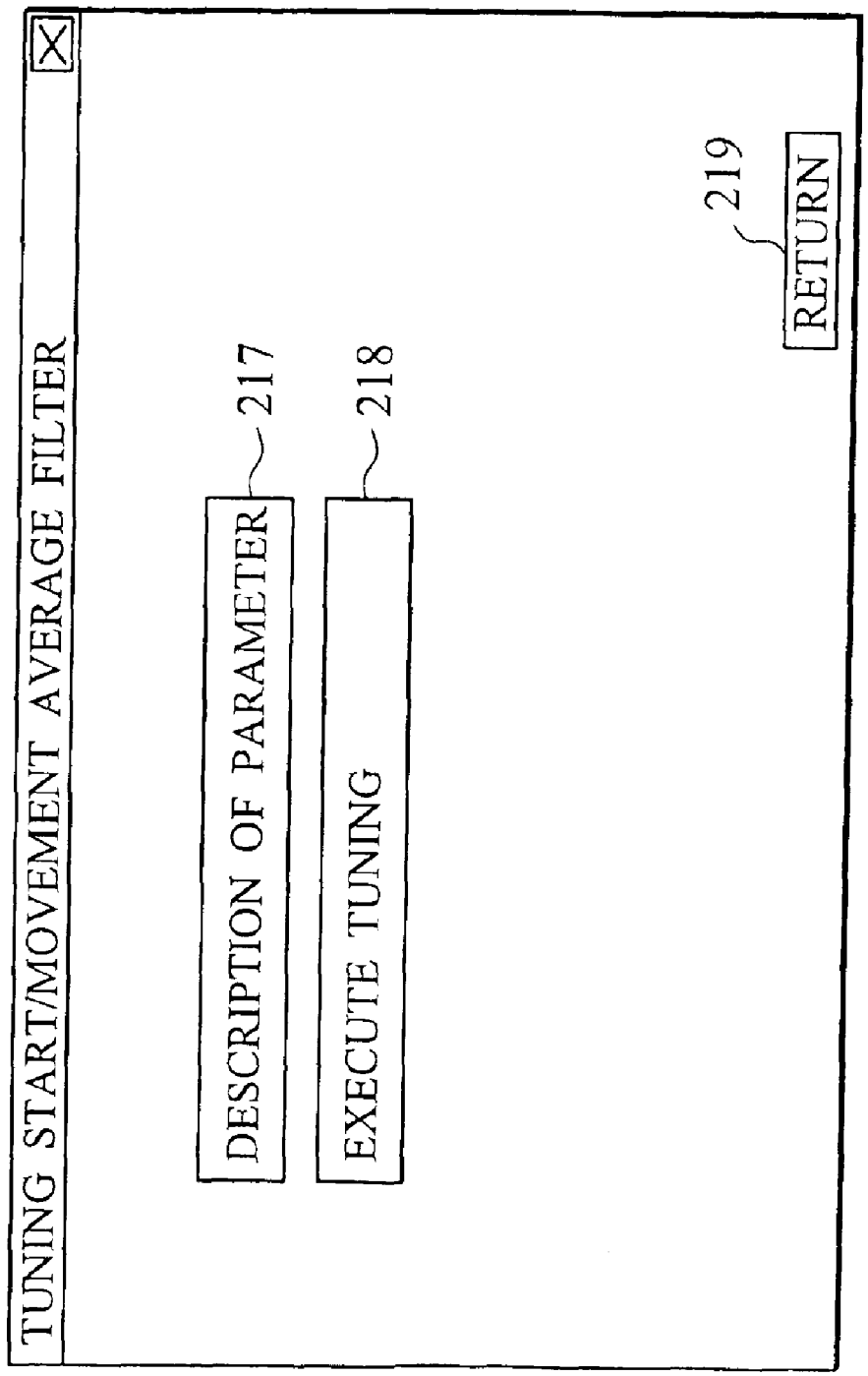
FIG. 15 is an illustrative view showing a screen display for a tuning start in the numerical control device according to the present invention.

As an "ADJUST" button 215 for executing adjustment is depressed on the adjustment parameter screen (see FIG. 14) (designated as YES in step S55), a screen for a tuning start, such as shown in FIG. 15, is displayed over the display 21 of the operation panel 16 (step S56). When a "RETURN" button 216 is depressed on the adjustment parameter screen (designated as YES in step S55A), the display is returned to the display of the surface roughness defect content selection screen in a manner such as shown in FIG. 13.

Figure 16:
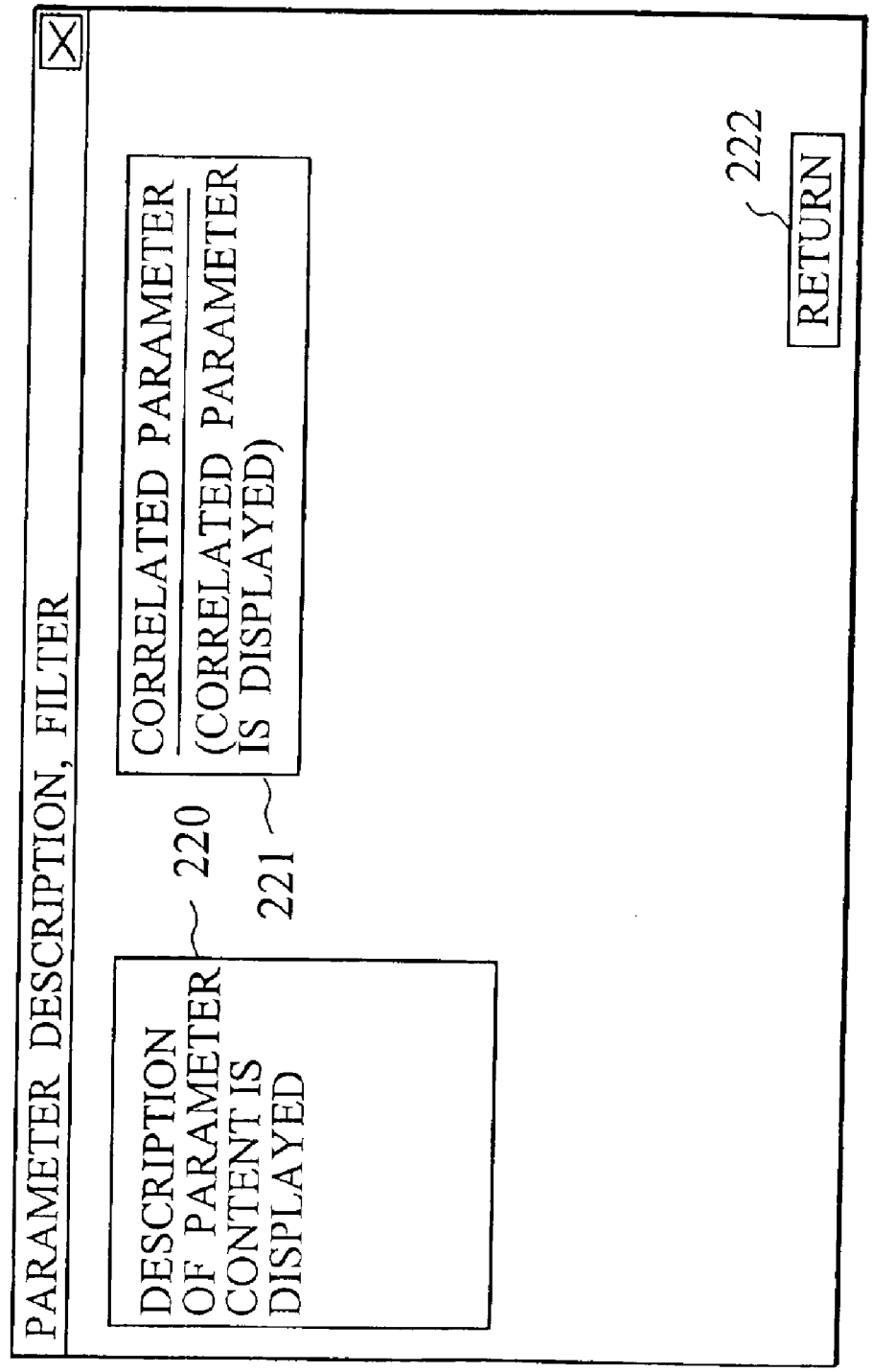
FIG. 16 is an illustrative view showing a screen display for a parameter description in the numerical control device according to the present invention.

FIG. 15 shows a tuning start screen in a situation where the parameter of the object to be adjusted includes a moving average filter that forms one of servo parameters. If, on this screen, a "DESCRIBE PARAMETER" button 217 is depressed (designated as YES in step S58), a parameter description screen, as shown in FIG. 16, is displayed over the display 21 of the operation panel 16 (step S59).

The parameter description screen is provided with a display of a text for illustrating parameter contents at a parameter description column 220 and a display of correlated parameters, a precaution and items related with machining at a correlated parameter display column 221. If a "RETURN" button 222 is depressed on such a parameter description screen (designated as YES in step S60), the display returns to the display of the tuning start screen (step S56).

Figure 17:
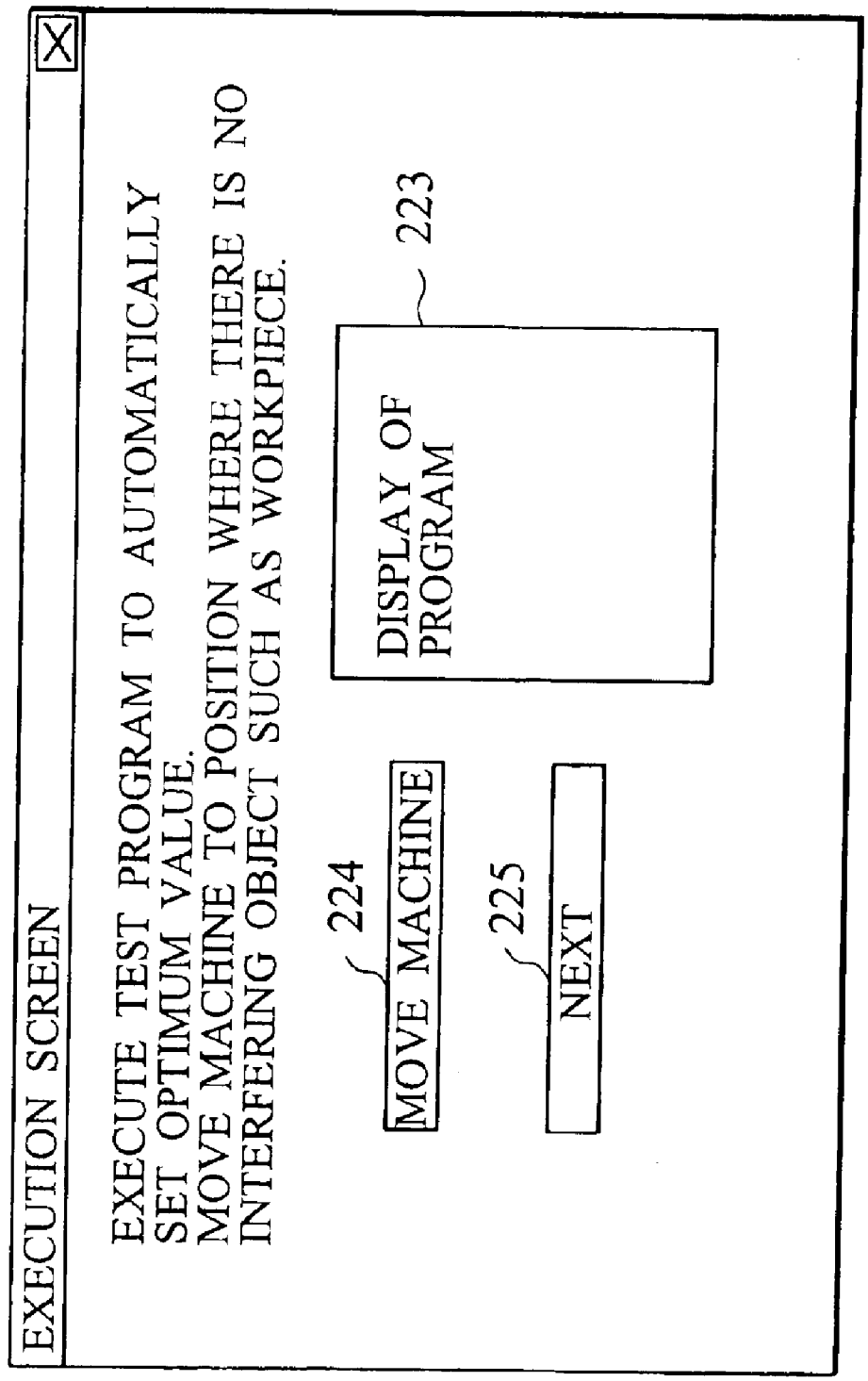
FIG. 17 is an illustrative view showing a screen display for a tuning execution in the numerical control device according to the present invention.

If a "EXECUTE TUNING" button 218 is depressed on the tuning start screen in FIG. 15 (designated as YES in step S61), a tuning execution screen, as shown in FIG. 17, is displayed over the display 21 of the operation panel 16 (step S62). Also, even when a "RETURN" button 219 is depressed on the tuning start screen (designated as YES in step S 57), the display returns to the display of the adjustment parameter screen in the manner as shown in FIG. 14 (step S53).

Figure 18:
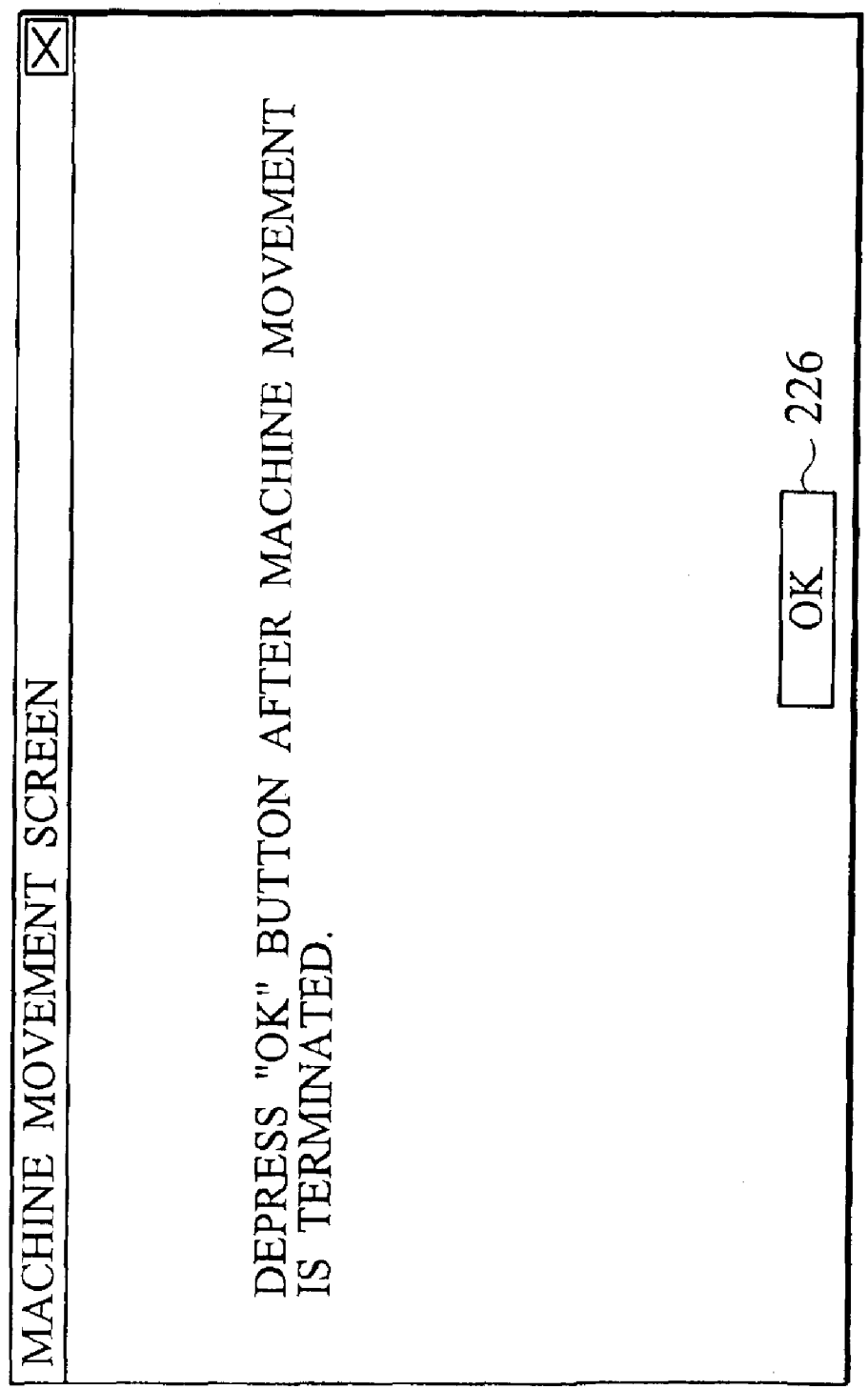
FIG. 18 is an illustrative view showing a screen display for a machine movement in the numerical control device according to the present invention.

On the tuning execution column, a program for machine movement is displayed at a program display column 223. On this screen, if a "MOVE MACHINE" button 224 is depressed (designated as YES in step S63), a machine movement screen, as shown in FIG. 18, (step S64) is displayed. On the contrary, on the tuning execution column, if a "NEXT" button 225 is depressed (designated as YES in step S67), then the operation returns to the original routine.

Subsequent to the execution for moving the machine to a position where there is no interfering object such as the workpiece (the object to be machined), if an "OK" button 226 is depressed on the machine movement screen (designated as YES in step S65), a subroutine for the parameter setting is retrieved (step S66).

(Adjustment For Accuracy of Form Correlated Parameter)

Figure 6:
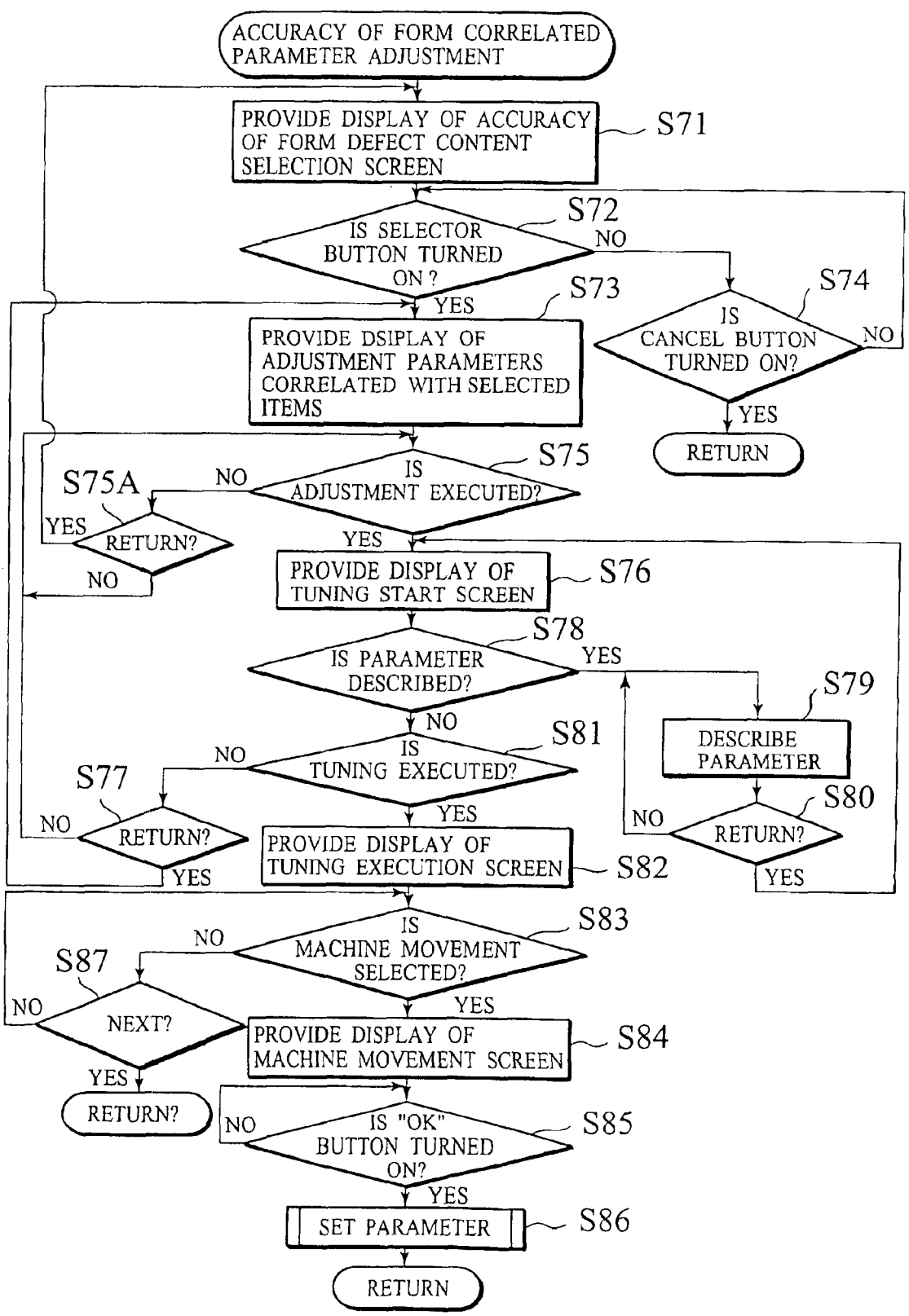
FIG. 6 is a flowchart illustrating a subroutine for shape accuracy correlated parameter adjustment in the numerical control device according to the present invention.

A subroutine for enabling adjustment of parameters correlated with the shape accuracy is described with reference to FIG. 6.

Figure 19:
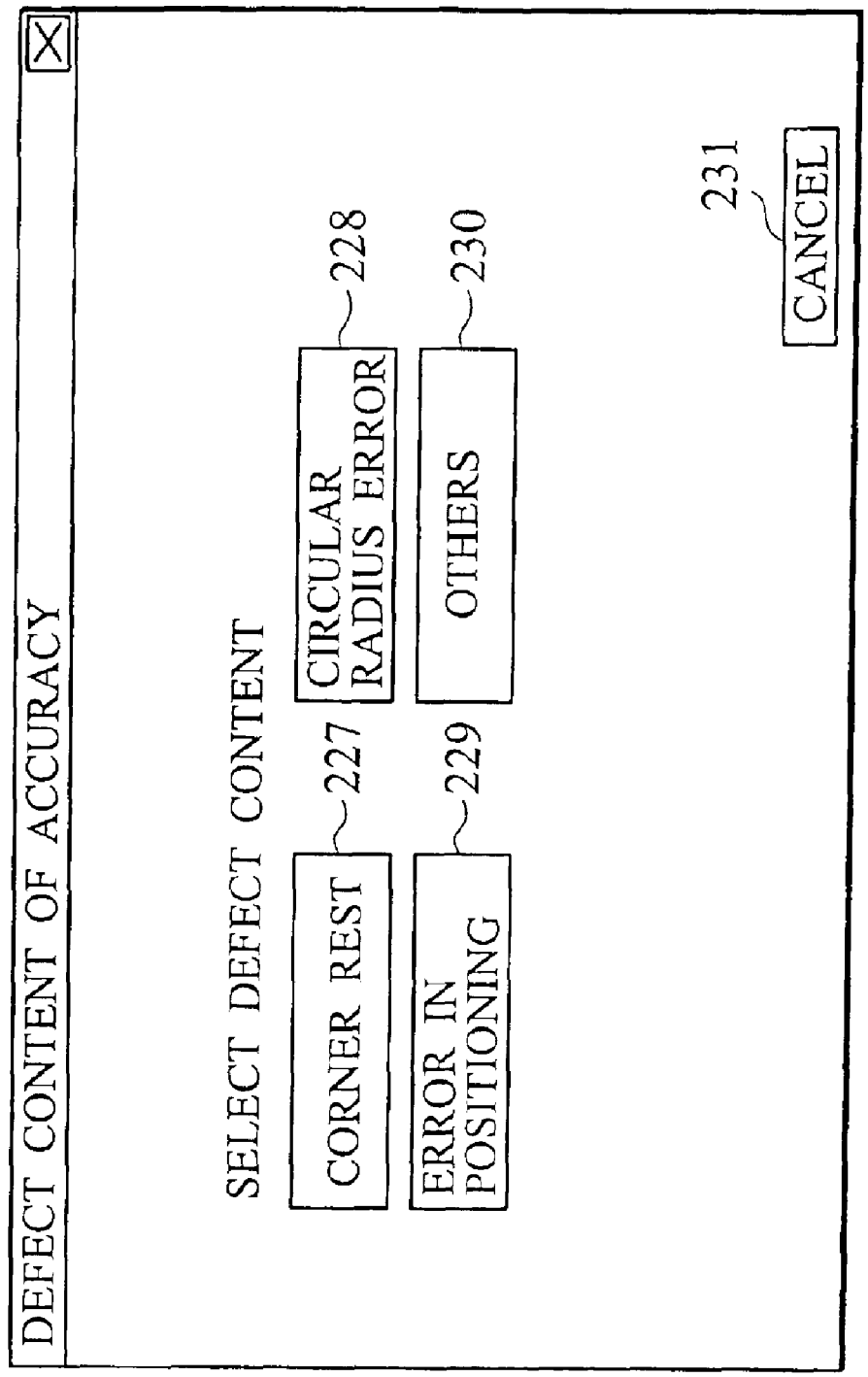
FIG. 19 is an illustrative view showing a screen display for a shape accuracy defect content selection in the numerical control device according to the present invention.

Initially, if the "ACCURACY OF FORM" button 205 is depressed on the shape accuracy defect item selection screen shown in FIG. 12, then a shape accuracy defect content screen is displayed over the display 21 of the operation panel 16 in a manner as shown in FIG. 19 (step S71).

The shape accuracy defect item selection screen is provided with buttons, to allow the defect contents in the shape accuracy to be designated, such as a "CORNER REST" button 227, a "CIRCULAR RADIUS ERROR" button 228, a "ERROR IN POSITIONING" button 229 and an "OTHERS" button 230. The user selects one of these defect content selection buttons to allow the defect content of the shape accuracy to be designated.

Figure 20:
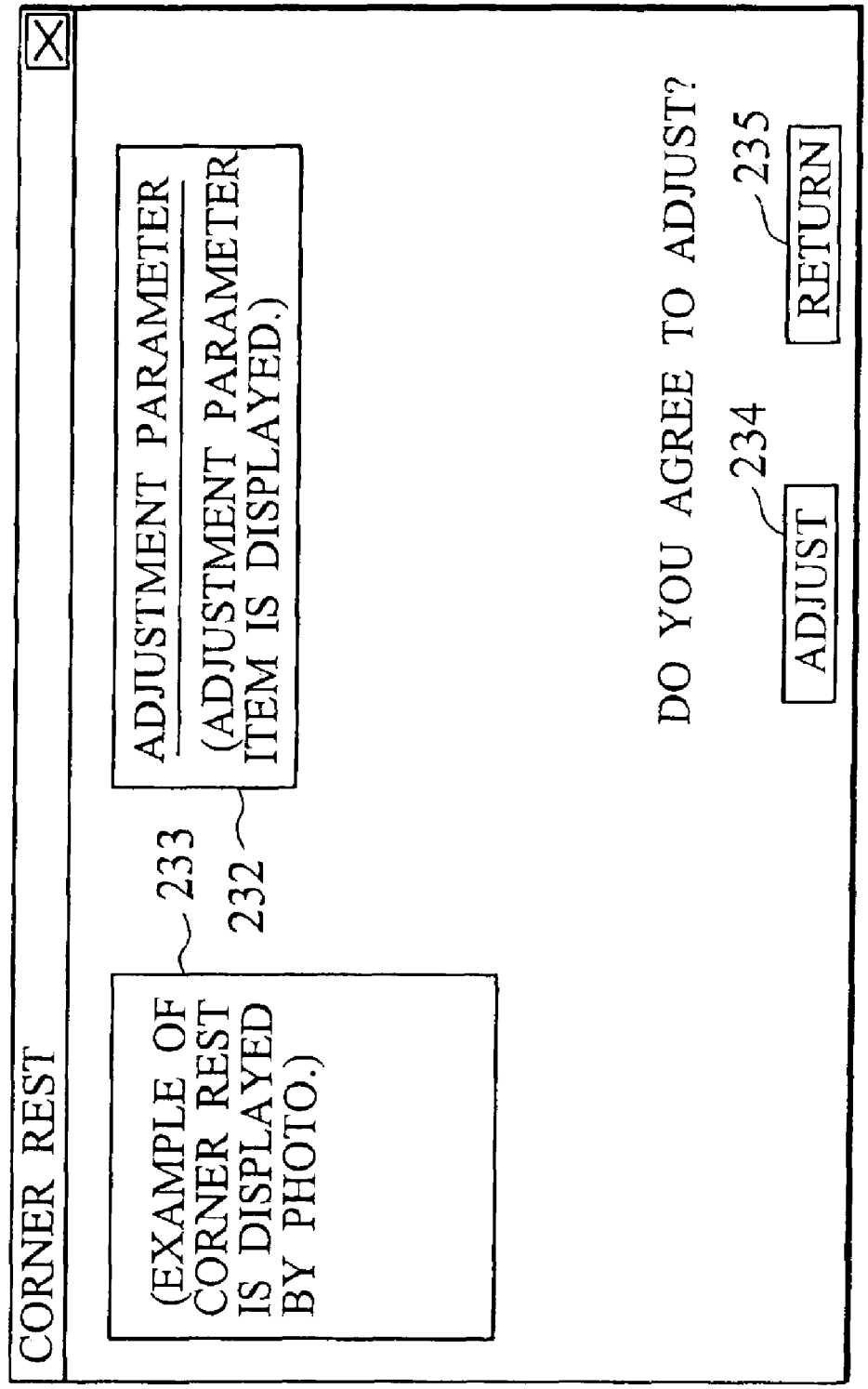
FIG. 20 is an illustrative view showing one of screen displays for the parameter adjustment in the numerical control device according to the present invention.

If either one of such selection buttons is selected (designated as YES in step S72), then a screen for an adjustment parameter correlated with the selected item (defect content) is displayed over the display 21 of the operation panel 16 (step S73). For instance, as the "CORNER REST" button 227 is selected, the display is provided with an adjustment parameter screen 232, as shown in FIG. 20, correlated with a corner rest.

In accordance with the rule of the predetermined defect occurrence correlated parameter, a list of the parameters for the objects to be adjusted in correlation with the selected defect content is displayed at an adjustment parameter column 232, and an image display column 233 is provided with a display of a photo of an example of an error (for instance, the corner rest).

Also, if a "CANCEL" button 231 (FIG. 19) is depressed on the defect content selection screen for the accuracy of form (designated as YES in step S74), then operation promptly returns to the original routine.

If an "EXECUTE ADJUSTMENT" button 234 is depressed (designated as YES in step S75) on the adjustment parameter screen, the display 21 of the operation panel 16 is provided with the tuning start screen (in the same manner as in the surface roughness) shown in FIG. 15 (step S76). If a "RETURN" button 235 is depressed (designated as YES in step S75A) on the adjustment parameter screen, then the display returns to the shape accuracy defect content selection screen shown in FIG. 19 (step S71).

FIG. 15 shows a tuning start screen under a situation in which the parameter for the object to be adjusted includes the movement average filter that forms one of the servo parameters, and if the "DESCRIBE PARAMETER" button 217 is depressed on that screen (designated as YES in step S78), then the display 21 of the operation panel 16 is provided with a display of the description screen of the parameter shown in FIG. 16 (step S79).

The parameter description screen includes the parameter description column 220 that provides a text for illustrating the parameter content, and the correlated parameter display column 221 that provides a display of the correlated parameters. If the "RETURN" button 222 is depressed on the parameter description screen (designated as YES in step S80), operation returns to the display of the tuning start screen (step S76).

If, on the tuning start screen, the "EXECUTE TUNING" button 218 is depressed (designated YES in step S81), the display 21 of the operation panel 16 is provided with a display of the tuning execution screen shown in FIG. 17 (step S82). Also, even when the "RETURN" button 219 is depressed on the tuning start screen (designated YES in step S77), operation returns to the display of the adjustment parameter screen shown in FIG. 14 (step S73).

The tuning execution screen provides a display of the machine movement program at the program display column. On such a screen, if the "MOVE MACHINE" button 224 is depressed (designated as YES in step S83), the machine movement screen shown in FIG. 18 is displayed over the display 21 of the operation panel 16 (step S84). In contrast, is the "NEXT" button 225 is depressed on the tuning execution screen (step S87), operation is returned to the original routine.

Subsequent to the operation for executing the machine movement to the position where there is no interfering object such as the workpiece (object to be machined), if the "OK" button 226 is depressed on the machine movement screen (designated as YES in step S85), operation is executed to retrieve the subroutine for setting the parameter (step S86).

(Parameter Setting Operation)

The subroutine for enabling the parameter setting is described with reference to FIGS. 7 and 8.

Figures 21A, 21B:
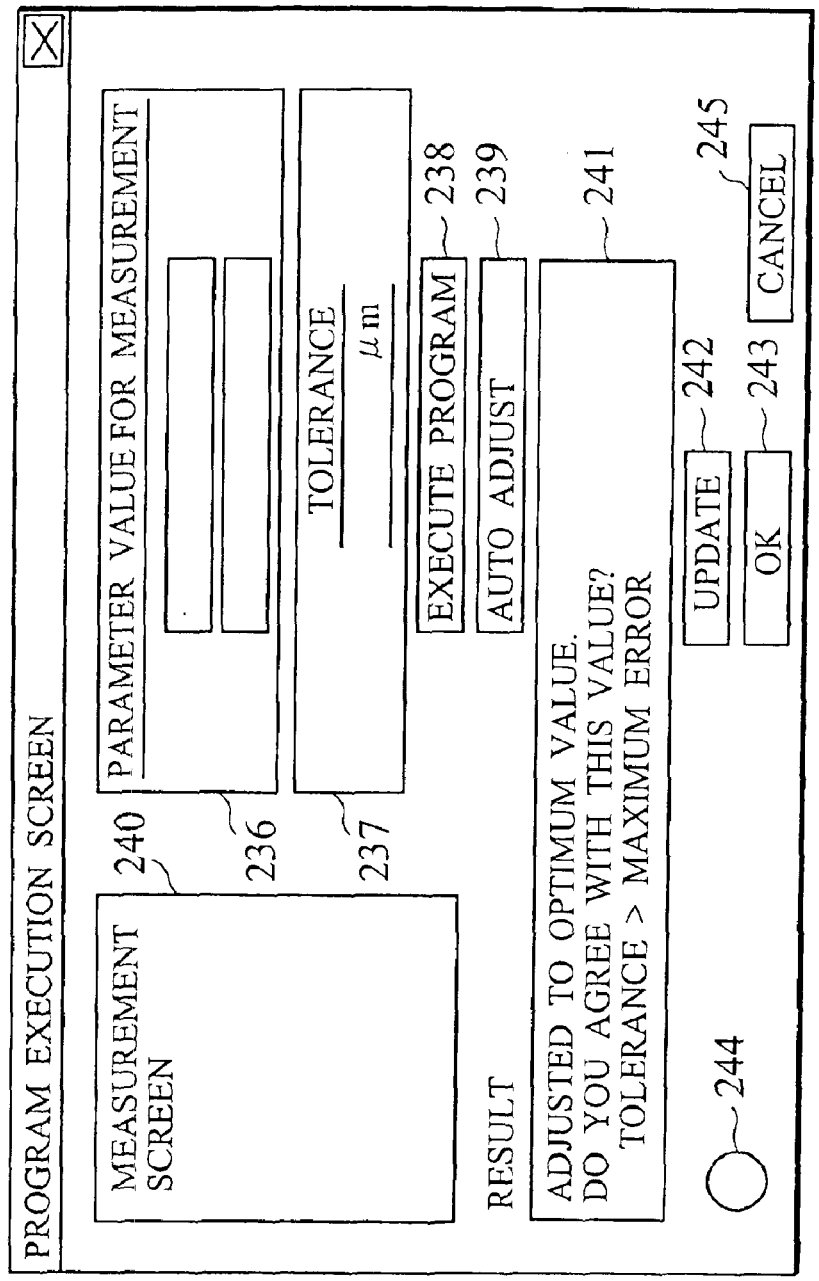
FIG. 21A is an illustrative view showing a screen display for a program execution in the numerical control device according to the present invention.
FIG. 21B is an illustrative view showing a screen display for an error message in the numerical control device according to the present invention.

Initially, a program execution screen, as shown in FIG. 21A, is displayed over the display 21 of the operation panel 16 (step S91).

The program execution screen provides a display of a display column 236 for a current parameter value, an input column 237 for an tolerance, a "EXECUTE PROGRAM" button 238, an "AUTO ADJUST" button 239, a measured screen 240, a result display column 241, a "UPDATE" button 242, an "OK" button 243, an "DISPLAY ERROR" button 244 and a "CANCEL" button 245.

The display column 236 of the current parameter value provides a display of screen in which, in accordance with the rule of the preset defect occurrence correlated parameter, a current value of the parameter, for the object to be adjusted, correlated with the selected defect content (defect content selectively set in step S52 or step S72) is executed and displayed.

Using this program execution screen, the user is able to input an tolerance into the input column 237 (step S92). Here, if the "EXECUTE PROGRAM" button 238 is depressed (designated as YES in step S93), the current parameter is saved (step S94), with the subroutine for enabling execution of the measurement program being retrieved (step S95).

Figure 9:
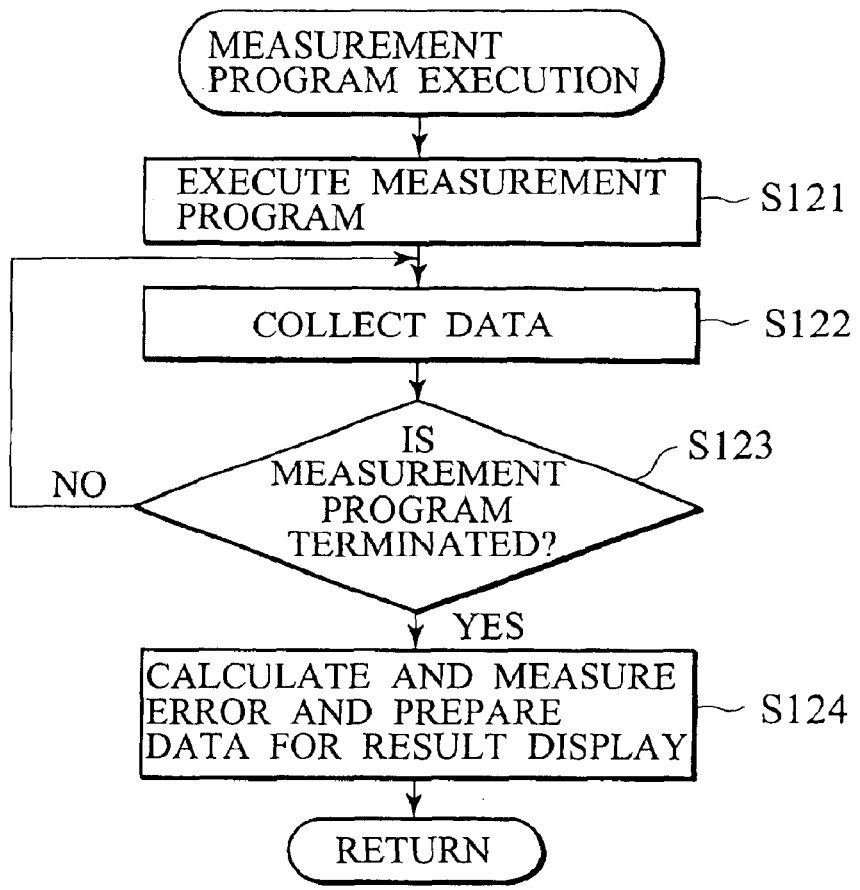
FIG. 9 is a flowchart illustrating a subroutine for measurement program execution in the numerical control device according to the present invention.

Here, the subroutine for enabling execution of the measurement program is described with reference to FIG. 9. With the subroutine for enabling execution of the measurement program, operation is implemented to execute the preset measurement program (step S121). The measurement program includes a linear interpolation based on G01 Code with which two-axis movement based on the linear interpolation is executed from an original position to a given coordinate position at a given travel velocity. In the execution stage of the measurement program, measurements such as a linear encoder feed back value, a rotational velocity of the servo motor, a torque and a feed rate, etc., are conducted to allow data to be collected (step S122).

Upon termination of the measurement program, an error is calculated based on collected data to prepare data for displaying a measured result (step S124). This results in completion of the subroutine for the measurement program execution, and operation returns to the original routine.

Figure 7:
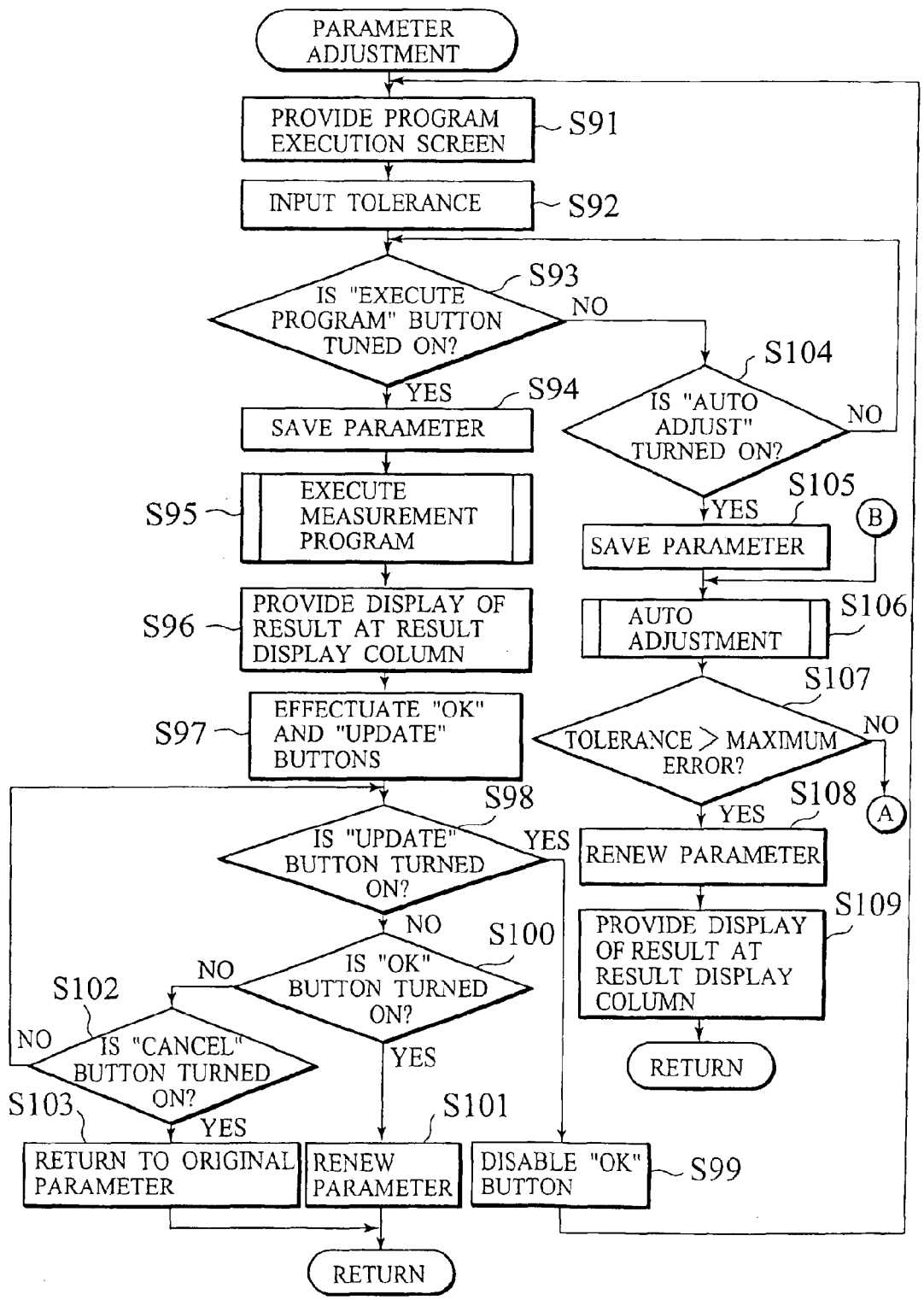
FIG. 7 is a flowchart illustrating one of the subroutines for parameter adjustment in the numerical control device according to the present invention.
Figure 8:
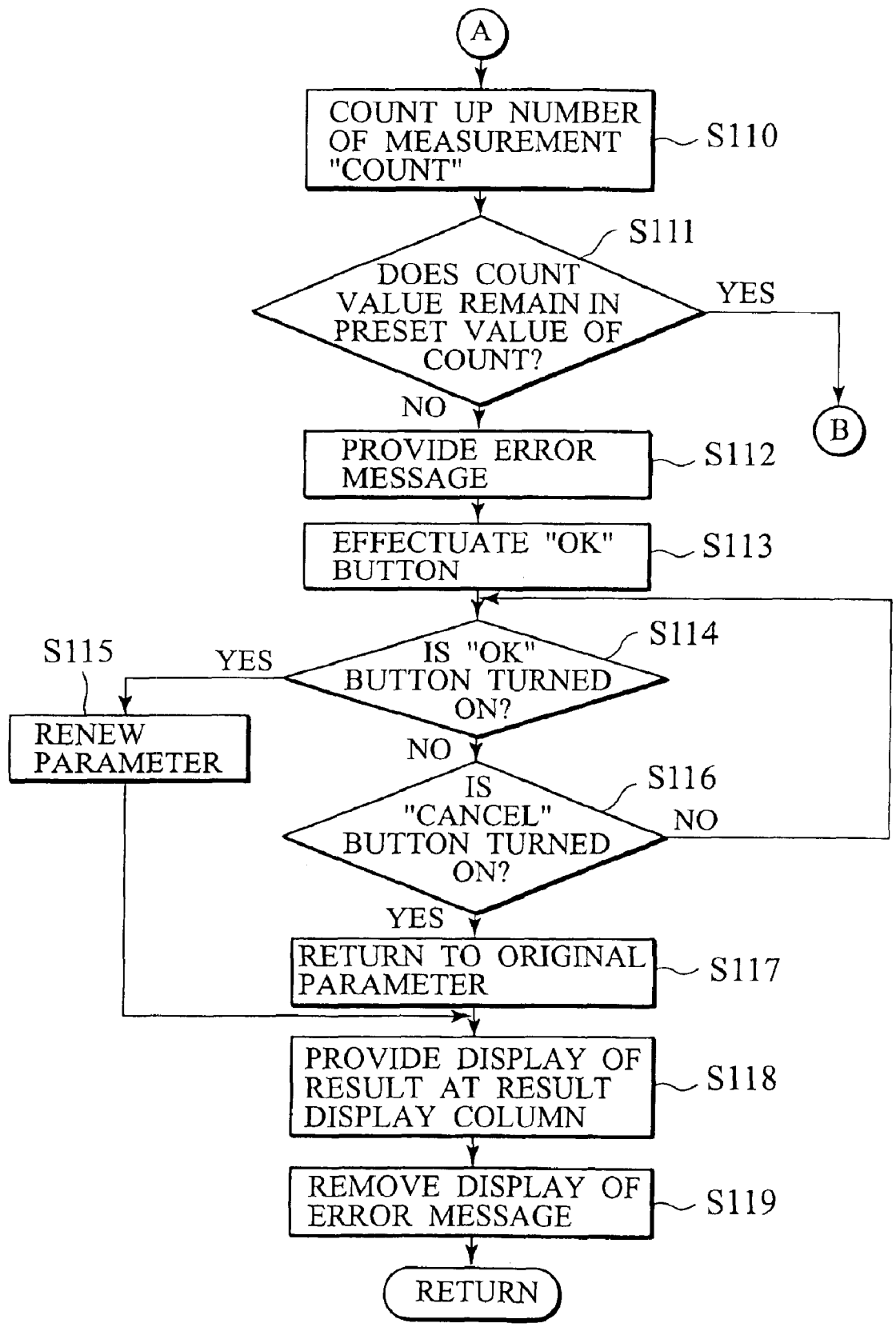
FIG. 8 is a flowchart illustrating one of the subroutines for parameter adjustment in the numerical control device according to the present invention.

Upon termination of the subroutine for enabling execution of the measurement program, operation returns to the subroutine for setting the parameter shown in FIG. 7 to provide a display of the result at the result display column 241 (step S 96), with the "OK" button 243 and the "UPDATE" button 242 being effectuated (step S97). The effectuations of the "OK" button 243 and the "UPDATE" button 242 are meant to permit the button, which is displayed in a thin state, to be displayed on the screen in a rich state to provide an ease for the user's recognition.

If the "UPDATE" button 242 is depressed (designated as YES in step S98), the "OK" button 243 is disabled (stepS99) to cause the program execution screen to be displayed (step S91).

On the contrary, if the "OK" button 243 is depressed (designated as YES in step S100), the parameter, for the object to be adjusted, correlated with the selected defect content (defect content selectively preset in step S52 or in step S72) is updated to a parameter value based on the display of the machined result that is displayed over the result display column 241 (step S101). Also, if the "Cancel" button 245 is depressed (designated as YES in step S102), then the parameter, saved in step S94, is retrieved and operation is returned to the original parameter (step S103).

After the tolerance is input, if the "AUTO ADJUST" button 239 is depressed on the program execution screen (designated as YES in step S104), the current parameter value is saved (step S105) to permit the subroutine for enabling the auto adjustment to be retrieved (step S106).

Figure 10:
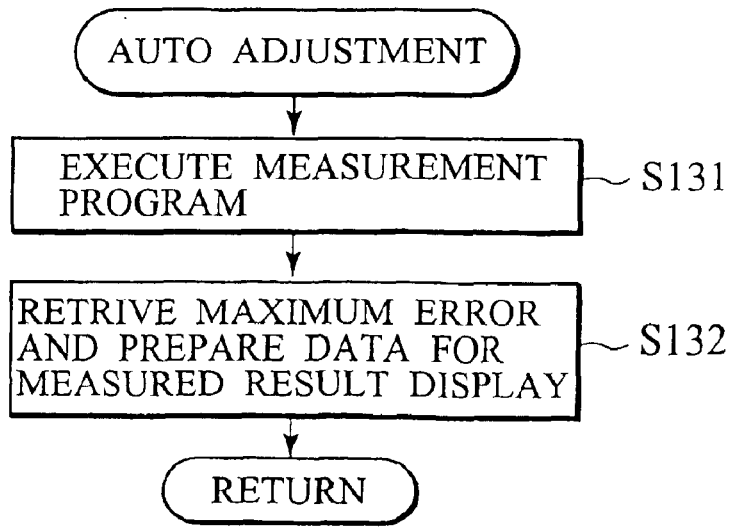
FIG. 10 is a flowchart illustrating a subroutine for auto adjustment in the numerical control device according to the present invention.

Here, the subroutine for the auto adjustment is described with reference to FIG. 10. The subroutine for the auto adjustment includes a step of retrieving and executing the subroutine for the above measurement program (step S131), and a step of retrieving the maximum error from the error calculated in the subroutine based on the measurement program after terminating the subroutine for the measurement program and preparing data for displaying the measured result (step S132). This results in the subroutine for the auto adjustment being terminated and operation returns to the original routine.

When the subroutine for the auto adjustment is terminated, operation returns to the subroutine for setting the parameter shown in FIG. 7 to discriminate as to whether the maximum error is less than or equal to the tolerance (step S107). If the maximum error is less than or equal to the tolerance (designated as YES in step S107), then the parameter, for the object to be adjusted, correlated with the selected defect content (defect content selectively preset in step S52 or step S72) is updated to a new parameter value that is set in the subroutine for the auto adjustment (step S108) such that the result is displayed at the result display column 241 (step S109) and operation returns to the original routine.

On the contrary, if the maximum error is bigger than the tolerance (designated as YES in step S107), the count value "COUNT" of the number of measurements is counted up (step S110), and operation is executed to discriminate whether the count value "COUNT" after the counting up operation remains in the preset value (step S111). If the count value "COUNT" after the counting up operation remains in the preset value (designated as YES in step S111), flow is routed back to step S106 to allow the subroutine for the auto adjustment to be executed again.

In contrast, if the count value "COUNT" after the counting up operation does not remain in the preset value (designated as NO in step S111), then a display of the error message is executed (step S112). In the display of the error message, the "ERROR" button 244 is flickered or altered in a warning color, and if the "ERROR" button 244 is depressed, the screen for the error message exemplarily as shown in FIG. 21B is displayed.

Then, the "OK" button 243 is effectuated (step S113) and if the "OK" button 243 is depressed (designated YES in step S114), the parameter, for the object to be adjusted, correlated with the selected defect content (defect content selectively set in step S52 or step S72) is updated to a new parameter value that is set in the subroutine for the auto adjustment (step S115). Subsequently, the result is displayed over the result display column 241 (step S118), and the display of screen for the error message is removed (step S119) while causing operation to be returned to the original routine.

The operations set forth above allow re-setting of the parameter (i.e., updated to the optimum value) correlated with the occurrence of the defect content set by the user.

In the absence of the selected optimum parameter, it is possible for these histories (the machining screen, content of the history memory section 12C) and related comments to be transferred to a service center.

Inputting an arbitrary parameter value may, in addition to the technique of setting the parameter on the basis of the measured result by executing the above measurement program, carry out re-setting of the parameter referring to the screens shown in FIGS. 21A and 21B. In this case, the parameter, for the object to the adjusted, correlated with the defect content selected by the user is extracted, with a less probability in erroneously setting the parameter.

Further, it is possible to re-set the parameter by retrieving history data of the fine machining stored in the history memory section 12C and history data of the defective machining and by referring thereto.

Furthermore, inputting a comment indicative of the defect content may, in addition to the technique of implementing selection from the preset items, also carry out designating the defect content.

What is claimed is:

1. A numerical control device comprising:
   a memory section that stores discrete optimum parameters for operational modes, respectively;
   a machining history memory section that stores a parameter set value appearing when executing a machining program and information related to a machined result for each machining program which is executed;
   a defect content setting unit for setting a defect content of a machined result through the user's operation;
   an operational mode setting section configured to set a particular operational mode through a user's operation;
   wherein a particular parameter, for the particular operational mode selected and set with the operational mode setting section, is retrieved from the memory section for setting the particular parameter to be executed.

2. The numerical control device of claim 1, wherein the discrete optimum parameters for the respective operational modes include servo parameters correlated with axes to be controlled, respectively.

3. The numerical control device of claim 1,
   wherein a retrieved parameter, correlated with occurrence of the defect content that is set with the defect content setting unit, is retrieved from the memory section in accordance with a preset rule to update the retrieved parameter.

4. The numerical control device of claim 1, further comprising:
   an image pickup unit that pickups an image of a machined workpiece to produce image information;
   wherein machined result related information includes the image information pickup with the image pickup unit.

* * * * *